(12) United States Patent
Yano et al.

(10) Patent No.: US 9,364,921 B2
(45) Date of Patent: *Jun. 14, 2016

(54) METHOD OF MANUFACTURING LASER WELDED STEEL PIPE

(75) Inventors: Koji Yano, Chiba (JP); Hiroyuki Sumi, Chiba (JP); Kenji Oi, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 14/004,271

(22) PCT Filed: Apr. 28, 2011

(86) PCT No.: PCT/JP2011/060804
§ 371 (c)(1),
(2), (4) Date: Dec. 3, 2013

(87) PCT Pub. No.: WO2012/132023
PCT Pub. Date: Oct. 4, 2012

(65) Prior Publication Data
US 2014/0124481 A1    May 8, 2014

(30) Foreign Application Priority Data
Mar. 30, 2011   (JP) ................. 2011-076266

(51) Int. Cl.
*B23K 26/262*  (2014.01)
*B23K 26/28*   (2014.01)
(Continued)

(52) U.S. Cl.
CPC ............... *B23K 26/285* (2013.01); *B21C 37/08* (2013.01); *B23K 26/0608* (2013.01);
(Continued)

(58) Field of Classification Search
CPC .. B21C 37/08; B23K 26/0608; B23K 26/265; B23K 26/285; B23K 26/3206; B23K 2203/04; B23K 26/32; B23K 26/262; B23K 26/282; B23K 2203/50
See application file for complete search history.

(56) References Cited

U.S. PATENT DOCUMENTS 5,624,858 A    4/1997  Terashima
6,608,278 B1 *  8/2003  Xie .................... B26K 26/0608
                                              219/121.64

(Continued)

FOREIGN PATENT DOCUMENTS

DE    38 43 841 A1     6/1990
DE    10261422 A1 *    7/2004
(Continued)

OTHER PUBLICATIONS

Machine translation of Japan Patent document No. 2010-240,734, Sep. 2015.*

(Continued)

*Primary Examiner* — Geoffrey S Evans
(74) *Attorney, Agent, or Firm* — Oliff PLC (57) ABSTRACT

A method of manufacturing a laser welded steel pipe by forming a steel strip into a cylindrical open pipe and performing laser welding on edges that includes: emitting two laser beams along the edges from an upper surface side of the open pipe, the two laser beams being transmitted through different optical fibers with in-focus spot diameters exceeding 0.3 mm; emitting leading and trailing laser beams each inclined toward a direction in which welding proceeds at an incident angle with respect to a direction perpendicular to an upper surface of the open pipe; setting the incident angle of the leading laser beam to be larger than the incident angle of the trailing laser beam; and setting a gap between a center point of the leading laser beam and a center point of the trailing laser beam on a back surface of the open pipe to 1 mm or larger.

6 Claims, 2 Drawing Sheets

(51) Int. Cl.
 *B21C 37/08* (2006.01)
 *B23K 26/06* (2014.01)
 *B23K 26/32* (2014.01)

(52) U.S. Cl.
 CPC ............ *B23K 26/262* (2015.10); *B23K 26/282* (2015.10); *B23K 26/32* (2013.01); *B23K 2203/04* (2013.01); *B23K 2203/50* (2015.10)

(56) References Cited

U.S. PATENT DOCUMENTS

| | | | | |
|---|---|---|---|---|
| 2004/0200813 | A1* | 10/2004 | Alips | B23K 15/0046 219/121.63 |
| 2005/0028897 | A1* | 2/2005 | Kurz | B23K 26/0608 148/525 |
| 2006/0278618 | A1 | 12/2006 | Forrest et al. | |
| 2007/0210042 | A1 | 9/2007 | Forrest et al. | |
| 2008/0116175 | A1 | 5/2008 | Ballerini et al. | |
| 2010/0288738 | A1* | 11/2010 | Jones | B23K 26/0608 219/121.63 |
| 2011/0023990 | A1* | 2/2011 | Yano | B21C 37/0811 219/121.64 |
| 2011/0215074 | A1 | 9/2011 | Wang et al. | |
| 2014/0124481 | A1 | 5/2014 | Yano et al. | |

FOREIGN PATENT DOCUMENTS

| | | |
|---|---|---|
| JP | A-59-101293 | 6/1984 |
| JP | A-1-99789 | 4/1989 |
| JP | A-7-144288 | 6/1995 |
| JP | A-8-90265 | 4/1996 |
| JP | A-8-155665 | 6/1996 |
| JP | A-9-24480 | 1/1997 |
| JP | H11-123578 A | 5/1999 |
| JP | B2-2902550 | 6/1999 |
| JP | 2000-683 A * | 1/2000 |
| JP | 2000-317667 A | 11/2000 |
| JP | 2003-334686 A | 11/2003 |
| JP | A-2004-330299 | 11/2004 |
| JP | B2-4120408 | 7/2008 |
| JP | 2009-166050 A | 7/2009 |
| JP | A-2009-178768 | 8/2009 |
| JP | A-2009-269036 | 11/2009 |
| JP | A-2010-167436 | 8/2010 |
| JP | 2010-240734 A * | 10/2010 |
| JP | A-2010-240734 | 10/2010 |
| WO | WO-2009-123330 A * | 8/2009 |
| WO | 2010/061422 A1 | 6/2010 |

OTHER PUBLICATIONS

Jun. 15, 2015 extended Search Report issued in European Patent Application No. 11862698.5.
International Search Report issued in International Patent Application No. PCT/JP2011/060804 mailed Aug. 23, 2011.
Jun. 15, 2015 Search Report issued in European Application No. 11862667.0.
Aug. 16, 2011 Search Report issued in International Application No. PCT/JP2011/060806.
Oct. 16, 2015 Notice of Allowance issued in U.S. Appl. No. 14/008,177.
Jul. 6, 2015 Office Action issued in U.S. Appl. No. 14/008,177.
U.S. Appl. No. 14/008,177, filed Nov. 26, 2013 in the name of Koji Yano et al.

* cited by examiner

METHOD OF MANUFACTURING LASER WELDED STEEL PIPE

TECHNICAL FIELD

The present invention relates to a method of manufacturing a steel pipe (or steel tube, hereinafter called a laser welded steel pipe) by welding longitudinal edges of an open pipe together using a laser beam, and particularly to a method of manufacturing a laser welded steel pipe appropriate for drilling and transporting oil or natural gas, such as oil country tubular goods or a line pipe.

BACKGROUND ART

Steel pipes used as oil country tubular goods or line pipes are broadly divided into welded steel pipes (for example, electric resistance welded steel pipes, UOE steel pipes, and other pipes) and seamless steel pipes. Among these steel pipes, electric resistance welded steel pipes are advantageous from an economical point of view because they can be manufactured at a low cost by using steel strips formed by hot rolling (so called hot rolled steel coils) as a starting material.

However, a typical electric resistance welded steel pipe inevitably includes a joint (a so-called seam) caused by welding because the electric resistance welded steel pipe is manufactured by forming a steel strip into a cylindrical shape using forming rolls to form an open pipe (here, an open pipe refers to a pipe-shaped strip formed by multiple forming rolls and having unwelded edges and such a pipe is referred to as an open pipe, below) and performing electric resistance welding (also referred to as high-frequency resistance welding) on edges of the open pipe (i.e., both side edges of the cylindrically formed steel strip) while pressing the open pipe with squeeze rolls. Such a seam has a problem of poor low-temperature toughness. Thus, oil country tubular goods or a line pipe employing an electric resistance welded steel pipe is difficult to use in a cold district. The reason why such a seam has poor low-temperature toughness is because, while edges are being welded together, the high-temperature molten metal reacts with atmospheric oxygen and forms an oxide, which is likely to remain in the seam.

The electric resistance welded steel pipe has another problem in that the corrosion resistance of the seam is likely to be reduced because an alloy element in the molten metal is likely to segregate while the edges are being welded together. Thus, oil country tubular goods or line pipes employing electric resistance welded steel pipes are difficult to use in a severe corrosion environment (for example, sour environment).

Meanwhile, welding with laser beams (hereinafter referred to as laser welding) has been receiving attention as a welding method with which the low-temperature toughness and the corrosion resistance of the seam are not reduced. With the laser welding, a heat source can have a small size and high-density heat energy can be converged. The laser welding thus can prevent an oxide from being formed in the molten metal or an alloy element from segregating in the molten metal. Thus, when the laser welding is employed in the manufacturing of welded steel pipes, the low-temperature toughness and the corrosion resistance of the seam can be prevented from being reduced.

Thus, a technology for manufacturing steel pipes (i.e., laser welded steel pipes) by emitting laser beams onto the edges of open pipes to weld the edges together has been put into practice during manufacturing of welded steel pipes.

The laser welding, however, is performed by irradiating a weld portion with a laser beam, which is a high-energy density light beam, converged by an optical component and causes a metal to melt rapidly. Thus, the molten metal scatters from the formed molten weld pool as spatter. The scattered spatter adheres to welding equipment, thereby degrading the quality of the seam. Concurrently, the spatter also adheres to the optical component, making the welding operation unstable. Since laser welding is performed by converging high-density heat energy, a large amount of spatter is formed, causing welding defects such as occurrence of undercut or underfill (or depression). If underfill occurs in a weld portion, the strength of the weld portion is reduced.

In view of these problems, various technologies for preventing adherence of spatter or occurrence of spattering during laser welding have been studied. For example, a technology for preventing the occurrence of spattering by reducing laser power or by changing a focus position by a large degree (that is, by defocusing) has been put into practice. Reduction of laser power or defocusing, however, not only leads to reduction of welding speed (i.e., reduction of weld efficiency) but also involves a problem of making lack of penetration more likely to occur.

Patent Literature 1 discloses a technology for preventing occurrence of spattering by dividing a laser beam into multiple laser beam spots. However, the laser welding technology using multiple laser beam spots into which a laser beam is divided is similar to the laser welding technology with a lower laser power. Thus, such a technology involves not only reduction of weld efficiency but also a problem of making lack of penetration more likely to occur. Furthermore, since prisms that divide laser beams are expensive, the cost of the welding operation inevitably increases.

Patent Literature 2 discloses a technology for preventing underfill of deposit metal from occurring by using a filler wire during laser welding. With this technology, however, the components of the filler wire change the composition of the weld metal. Thus, an appropriate filler wire has to be selected in accordance with the components of open pipes, thereby increasing the burden of stock management of filler wires or production control of laser welding.

Patent Literature 3 discloses a technology for preventing welding defects by using laser welding and arc welding together. This technology, however, makes the structure of welding equipment complex, thereby increasing the burden of not only maintenance but also management of the welding operation.

Patent Literature 4 discloses a method of using two circular beam spots. With this technology, however, welding defects are not reduced during laser welding performed under conditions in which stress occurs in a weld portion (under conditions such as where stress occurs in a molten weld pool due to the weld portion of an electric resistance welded steel pipe receiving an upset). Particularly, the amount of spatter generated from the back surface of a steel strip increases.

CITATION LIST

Patent Literature

PTL 1: Japanese Patent No. 2902550
PTL 2: Japanese Unexamined Patent Application Publication No. 2004-330299
PTL 3: Japanese Patent No. 4120408
PTL 4: Japanese Unexamined Patent Application Publication No. 2009-178768

SUMMARY OF INVENTION

Technical Problem

An object of the present invention is to provide a method of stably manufacturing a laser welded steel pipe at a high yield ratio when a laser welded steel pipe is manufactured, while spattering is prevented from occurring, the likelihood of undercut or underfill occurring in a weld portion is reduced, and a weld portion of excellent quality is obtained without reducing weld efficiency. The method involves appropriately maintaining incident angles of two laser beams that are incident on a workpiece and maintaining the in-focus spot diameters of the laser beams, appropriately arranging the two laser beams, and controlling the laser welding settings.

Solution to Problem

The inventors investigated and studied a laser welding technology for forming a weld portion having no welding defects in order to manufacture a laser welded steel pipe by performing laser welding on edges of an open pipe.

Figure 2:
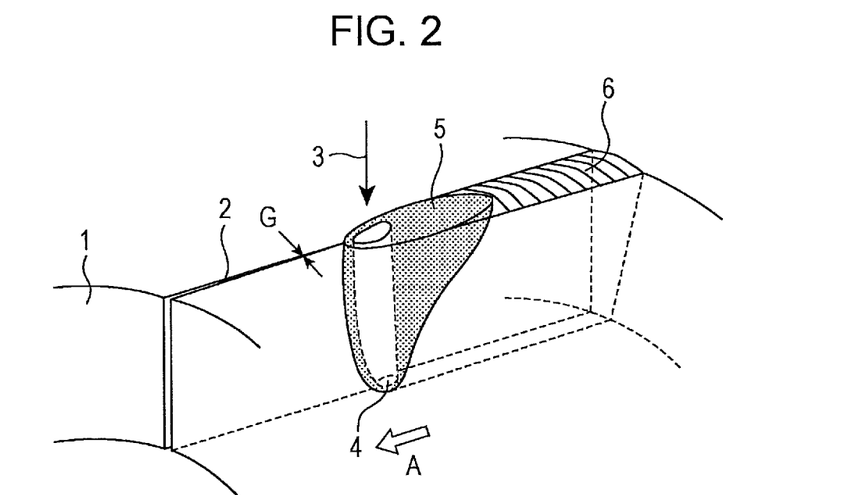

FIG. 2 is a perspective view that schematically illustrates a conventional way of laser welding a joint between edges 2 of an open pipe 1 by vertically emitting a laser beam when a laser welded steel pipe is manufactured. The arrow A in FIG. 2 indicates the direction in which welding proceeds. Here, a deep cavity (hereinafter referred to as a keyhole) 4 that is formed as a result of emission of a laser beam 3 and a molten metal 5 formed around the keyhole 4 are illustrated in perspective.

As illustrated in FIG. 2, when a laser beam 3 is emitted, edges 2 melt due to convergent high-density heat energy and a keyhole 4 is formed in a molten metal 5 due to evaporating pressure and evaporating reaction force that occur when the molten metal 5 evaporates. The inside of the keyhole 4 is considered to be filled with high-temperature plasma that has occurred as a result of the laser beam 3 entering the keyhole 4 and metal vapour being electrolytically dissociated by the energy of the laser beam 3.

The keyhole 4 indicates a position at which the heat energy of a laser beam 3 converges the most. By positioning a joint between the edges within the keyhole 4, a laser welded steel pipe can be stably manufactured. In the case of a single laser beam, however, a highly precise groove processing technology is required to make the joint between the edges 2 coincide with the keyhole 4. If the processing state of the edges 2 or the butting state of the edges 2 is unstable, the molten metal 5 is made unstable. Consequently, spattering frequently occurs and welding defects such as undercut or underfill are more likely to occur.

In the situation where stress occurs in a molten weld pool due to the weld portion receiving an upset, the energy of a laser beam to be emitted has to be further increased in order to maintain the keyhole. This increase of the energy increases the amount of spatter and prevents a groove from fully melting, leading to the occurrence of welding defects such as undercut or underfill.

In view of this, the inventors focused their attention on a technology for emitting two laser beams onto a joint between the edges 2. The inventors consequently found that spattering can be prevented from occurring by emitting two laser beams such that positions onto which the laser beams are emitted are appropriately determined and the settings of the laser beams, such as incident angles or spot diameters, are controlled in order that the laser beams do not cross each other inside the steel strip of the open pipe. This finding proved that a weld portion of excellent quality can be obtained in the above-described manner while undercut or underfill is prevented from occurring in the weld portion without reducing weld efficiency and that a laser welded steel pipe can be stably manufactured at a high yield ratio.

Although the details regarding the mechanism that prevents spattering from occurring are not known, the following reasons have been presumed. Spatter is prevented from scattering by dividing energy into two laser beams emitted onto a workpiece at incident angles, preheating the steel strip using one of the laser beams that is ahead of the other in the welding direction while suppressing spattering, and then melting the steel strip using the trailing laser beam. Here, the incident angle of each laser beam indicates the angle formed between a direction perpendicular to an upper surface of a workpiece and a direction in which the laser beam is emitted.

The present invention is made in view of these findings.

Specifically, the present invention provides a method of manufacturing a laser welded steel pipe by forming a steel strip into a cylindrical open pipe with forming rolls and performing laser welding on edges of the open pipe by emitting a laser beam onto the edges of the open pipe while pressing the edges with squeeze rolls, the laser welding including: emitting two laser beams along the edges from an upper surface side of the open pipe, the two laser beams being transmitted through different optical fibers and having in-focus spot diameters exceeding 0.3 mm; emitting the laser beams such that a leading laser beam of the two laser beams and a trailing laser beam of the two laser beams are each inclined toward a direction in which welding proceeds at an incident angle with respect to a direction perpendicular to an upper surface of the open pipe, the leading laser beam being ahead of the trailing laser beam on the upper surface of the open pipe in the direction in which welding proceeds, the trailing laser beam being behind the leading laser beam on the upper surface of the open pipe in the direction in which welding proceeds; setting the incident angle of the leading laser beam to be larger than the incident angle of the trailing laser beam; and setting a gap between a center point of the leading laser beam and a center point of the trailing laser beam on a back surface of the open pipe to 1 mm or larger.

In the method of manufacturing a laser welded steel pipe according to the present invention, preferably, the incident angles of the leading laser beam and the trailing laser beam fall within a range from 5 to 50°. Either one or both of the leading laser beam and the trailing laser beam may be divided into two by an optical component and emitted onto both sides of the edges. Preferably, a weld portion receives an upset of 0.2 to 1.0 mm when the laser welding is performed. Preferably, the laser welding is performed with the sum of laser power of the leading laser beam and the trailing laser beam exceeding 16 kW and at a welding speed exceeding 7 m/min. Preferably, the steel strip is preheated before the laser welding is performed and a weld bead is processed by machining or grinding after the laser welding has been performed.

Advantageous Effects of Invention

According to the present invention, a weld portion of excellent quality can be obtained during manufacturing of a laser welded steel pipe without reducing weld efficiency by preventing spattering from occurring and an undercut or an underfill from being formed in the weld portion. Consequently, a laser welded steel pipe can be stably manufactured at a high yield ratio. The obtained laser welded steel pipe has a seam that has excellent low-temperature toughness and excellent corrosion resistance and is thus appropriate for oil country tubular goods or a line pipe used in a cold district or corrosion environment.

BRIEF DESCRIPTION OF DRAWINGS

FIG. 1 is a perspective view schematically illustrating a case to which the present invention is applied where a joint between edges of an open pipe is welded using two laser beams. FIG. 1 illustrates a keyhole and a molten metal formed around the keyhole in perspective.

FIG. 2 is a perspective view schematically illustrating a conventional case where a joint between edges of an open pipe is welded using one laser beam. FIG. 2 illustrates a keyhole and a molten metal formed around the keyhole in perspective.

DESCRIPTION OF EMBODIMENTS

Figure 1:
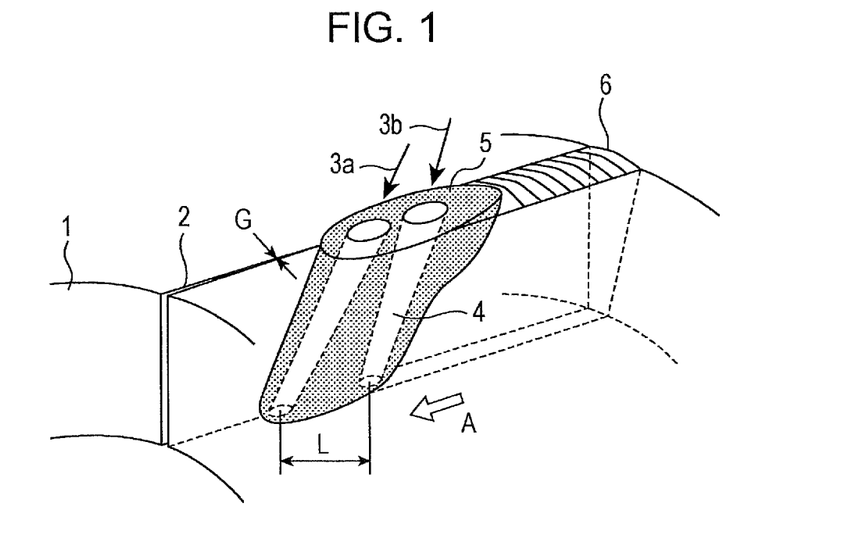

FIG. 1 is a perspective view schematically illustrating a case to which the present invention is applied where edges of an open pipe are welded together using two laser beams. The arrow A in FIG. 1 indicates a direction in which welding proceeds. FIG. 1 illustrates a keyhole 4, which occurs as a result of emission of laser beams 3a and 3b, and a molten metal 5 formed around the keyhole 4 in perspective.

In the present invention, two laser beams 3a and 3b are emitted from an upper surface side of the open pipe 1 along edges 2 of the open pipe 1. At this time, if a laser beam transmitted through a single optical fiber is divided into two beams by an optical component (for example, a prism) and the two beams are emitted, incident angles or spot diameters of the two beams, which will be described below, cannot be individually set. For this reason, the two laser beams 3a and 3b are required to be transmitted through different optical fibers.

One laser oscillator or two laser oscillators may be used. In the case where there is only one laser oscillator and two laser beams are to be transmitted, an oscillated laser beam is divided into two in the oscillator and then the two laser beams may be transmitted through different optical fibers.

As illustrated in FIG. 1, the laser beams 3a and 3b are arranged at the front and back along the edges 2. One laser beam that is ahead of the other laser beam on the upper surface of the open pipe 1 in the direction in which welding proceeds is defined as a leading laser beam 3a and the trailing laser beam that is behind the leading laser beam 3a is defined as a trailing laser beam 3b.

(1) In-Focus Spot Diameters of Leading Laser Beam and Trailing Laser Beam

When in-focus spot diameters of the leading laser beam 3a and the trailing laser beam 3b are 0.3 mm or smaller, a weld bead has a narrow width during welding and part of the groove remains unmelted. Thus, the in-focus spot diameters are set to exceed 0.3 mm. On the other hand, if the spot diameters exceed 1 mm, the laser beams have a small energy density and thus a keyhole is less likely to become stable.

Thus, preferably, the in-focus spot diameters of the leading laser beam 3a and the trailing laser beam 3b are 1 mm or smaller.

Preferably, the spots of the leading laser beam 3a and the trailing laser beam 3b have a circular shape, but may have an oval figure. In the case where the spots have an oval figure, the minor axis of the in-focus spots of each beam has to exceed 0.3 mm. In addition, the minor axis is preferably 1 mm or smaller for the same reason as in the case of the circular spot.

(2) Distance from Upper Surface of Open Pipe to Focus

The distance from the upper surface of the open pipe to the focus is denoted by t (mm) and the thickness of the steel strip of the open pipe is denoted by T (mm). If the distance t from the upper surface of the open pipe to the focus exceeds 3×T (specifically, 3T upward from the upper surface), the position of the focus is too high, making it difficult to stably maintain the keyhole. On the other hand, if the distance t exceeds −3×T (specifically, 3T downward from the upper surface), the position of the focus is too low, making spatter more likely to be generated from the back surface of the steel strip (i.e., the inner side of the open pipe). Thus, the distance t from the upper surface of the open pipe to the focus is preferably set so as to fall within a range from −3×T to 3×T.

Figure 3:
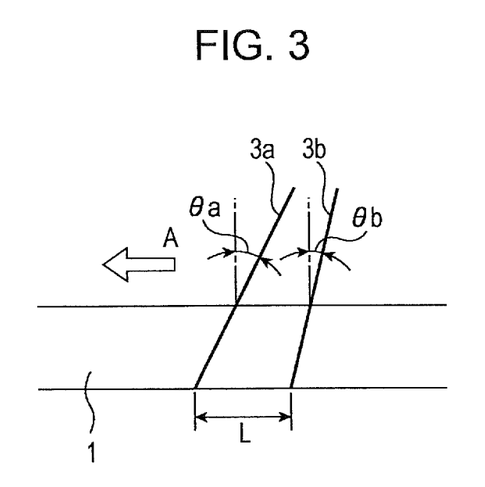
FIG. 3 is a side view schematically illustrating an example of an arrangement of a leading laser beam, a trailing laser beam, and lines perpendicular to the upper surface of the open pipe, which are shown in FIG. 1.

(3) Incident Angle of Leading Laser Beam and Incident Angle of Trailing Laser Beam FIG. 3 is a side view schematically illustrating an example of an arrangement of the leading laser beam 3a and the trailing laser beam 3b illustrated in FIG. 1 and lines perpendicular to the upper surface of the open pipe 1. As illustrated in FIG. 3, the leading laser beam 3a and the trailing laser beam 3b are emitted onto the upper surface of the open pipe 1 while being inclined toward the direction in which welding proceeds indicated by the arrow A. When an angle θa formed between the leading laser beam 3a and a line perpendicular to the upper surface of the open pipe 1 is defined as an incident angle of the leading laser beam 3a and an angle θb formed between the trailing laser beam 3b and a line perpendicular to the surface of the open pipe 1 is defined as an incident angle of the trailing laser beam 3b, the incident angles are set so as to satisfy θa>θb.

In addition, the leading laser beam 3a and the trailing laser beam 3b are arranged so as not to cross each other inside the steel strip of the open pipe 1. When the distance from the upper surface of the steel strip 1 to an intersection of the leading laser beam 3a and the trailing laser beam 3b is denoted by X (mm) and the strip thickness of the steel strip 1 is denoted by T (mm), it is preferable that X be set within a range 0 (i.e., the upper surface of the steel strip 1)≤X≤2×T (i.e., 2T upward from the upper surface of the steel strip 1). The reason for this setting is as follows. In the case where X<0, the leading laser beam 3a and the trailing laser beam 3b cross each other inside the steel strip 1. Thus, the keyholes 4 of the leading laser beam 3a and the trailing laser beam 3b are combined with each other and form a large keyhole, thereby easily forming a large amount of spatter. On the other hand, in the case where X>2×T, the molten metal 5 separates and thus the molten state of butted portion becomes unstable, thereby easily forming a large amount of spatter.

When the incident angle θa of the leading laser beam 3a and the incident angle θb of the trailing laser beam 3b are set so as to satisfy θa<θb, the distance from the upper surface to the back surface of the open pipe 1 for which the trailing laser beam 3b transmits increases. Thus, the energy of the trailing laser beam 3b is attenuated and the heating efficiency is reduced. Thus, the edges are unstably molten by the trailing laser beam 3b although the preheating effect of the leading laser beam 3a on the edges 2 is obtained.

If, on the other hand, the incident angles θa and θb are set so as to satisfy θa=θb, the keyholes 4 of the leading laser beam 3a and the trailing laser beam 3b become more likely to be combined with each other and form a large keyhole. Thus, a large amount of spatter may be formed.

For this reason, the incident angles of the leading laser beam 3a and the trailing laser beam 3b have to be set so as to satisfy θa>θb. Specifically, the inclination angle θa of the leading laser beam 3a is set to be larger to prevent spattering from occurring when preheating the edges 2. The inclination angle θb of the trailing laser beam 3b is set to be smaller to increase heating efficiency when melting the edges 2.

In this manner, the leading laser beam 3a preheats the edges 2. Moreover, since the leading laser beam 3a is emitted while being inclined toward the direction in which welding proceeds, spattering is prevented from occurring. Subsequently, the trailing laser beam 3b melts the edges 2. At this time, spattering does not occur since the edges 2 have been preheated. Consequently, spattering can be made less likely to occur and thus undercut or underfill can be prevented from occurring.

If the incident angle θa of the leading laser beam 3a is below 5°, the incident angle θa is too small and the leading laser beam 3a operates similarly as in the case where the leading laser beam 3a is vertically emitted. Thus, the leading laser beam 3a cannot have the effect of preventing spattering from occurring. On the other hand, if the incident angle θa exceeds 50°, the distance from the upper surface to the back surface of the open pipe 1 for which the leading laser beam 3a transmits increases and the energy of the leading laser beam 3a is attenuated. Thus, the leading laser beam 3a cannot have a sufficiently large preheating effect. Therefore, it is preferable that the incident angle θa of the leading laser beam 3a be within a range from 5 to 50°.

Similarly, if the incident angle θb of the trailing laser beam 3b is below 5°, the incident angle θb is too small and the trailing laser beam 3b operates similarly as in the case where the trailing laser beam 3b is vertically emitted. Thus, the trailing laser beam 3b cannot have the effect of preventing spattering from occurring. On the other hand, if the incident angle θb exceeds 50°, the distance from the upper surface to the back surface of the open pipe 1 for which the trailing laser beam 3b transmits increases and the energy of the trailing laser beam 3b is attenuated. Thus, the trailing laser beam 3b cannot penetrate the molten metal to a sufficient depth. Therefore, it is preferable that the incident angle θb of the trailing laser beam 3b be within a range from 5 to 50°.

(4) Gap Between Center Points of Leading Laser Beam and Trailing Laser Beam on Back Surface of Open Pipe A gap L between the center points of the leading laser beam 3a and the trailing laser beam 3b on the back surface of the open pipe 1 is set to be 1 mm or larger. When the gap L is 1 mm or larger, the molten weld pool on the back surface extends in the direction in which welding proceeds and the amount of spatter generated from the back surface decreases. Thus, a weld bead free from an undercut or an underfill can be obtained. If, however, the gap L exceeds 10 mm, the molten weld pool on the back surface separates and thus spattering is more likely to occur. Therefore, it is preferable that the gap L between the center points of the leading laser beam 3a and the trailing laser beam 3b be within a range from 1 to 10 mm.

(5) Upset Length

When laser welding is performed, it is preferable that a weld portion receives an upset of 0.2 to 1.0 mm. If the length of an upset is below 0.2 mm, a blowhole generated by the laser welding cannot be eliminated. On the other hand, if the length of an upset exceeds 1.0 mm, the laser welding is unstably performed and a larger amount of spatter is formed.

(6) Joint Between Edges of Open Pipe

The joint between the edges 2 of the open pipe 1 may be formed at any position at which an average distance G between the edges 2 in the strip thickness direction is reduced by squeeze rolls to 0.5 mm or smaller.

Figure 4:
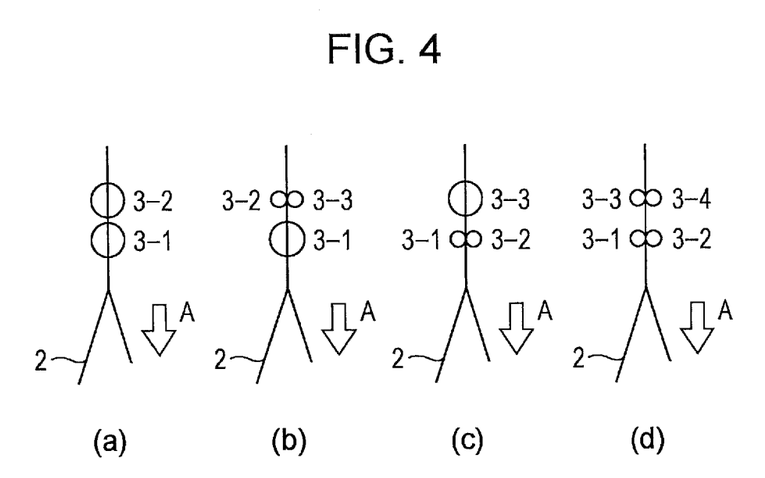
FIG. 4 is a plan view schematically illustrating examples of arrangements of an area or areas of the upper surface of the open pipe onto which the leading laser beam is emitted, an area or areas of the upper surface of the open pipe onto which the trailing laser beam is emitted, and edges.

Furthermore, either one of the leading laser beam 3a and the trailing laser beam 3b transmitted through different optical fibers from one or two laser oscillators may be emitted onto both sides of the edges 2 while being divided into two beams by an optical component (for example, a prism). FIG. 4(b) illustrates an example where the trailing laser beam 3b is emitted onto both sides of the edges 2 while being divided into two beams (irradiated areas 3-2 and 3-3). FIG. 4(c) illustrates an example where the leading laser beam 3a is emitted onto both sides of the edges 2 while being divided into two beams (irradiated areas 3-1 and 3-2). Alternatively, as illustrated in FIG. 4(d), the leading laser beam 3a and the trailing laser beam 3b may be emitted onto both sides of the edges 2 while the leading laser beam 3a is divided into two beams (irradiated areas 3-1 and 3-2) and the trailing laser beam 3b is divided into two beams (irradiated areas 3-3 and 3-4). By emitting the leading laser beam 3a and the trailing laser beam 3b in this manner, the state in which the edges 2 pass through the irradiated areas can be easily maintained.

(7) Laser Power of Laser Beam and Welding Speed

Generally, the amount of spatter that is formed during laser welding decreases as the laser power is reduced and as the welding speed is reduced. However, reduction in the laser power and the welding speed for the purpose of preventing spattering from occurring leads to reduction in productivity of laser welded steel pipes. In view of this, in the present invention, it is preferable that the sum of the laser-beam laser power of the leading laser beam 3a and the trailing laser beam 3b exceed 16 kW and laser welding be performed at a welding speed exceeding 7 m/min. If the sum of the laser power is not larger than 16 kW, the laser welding is performed at a welding speed not higher than 7 m/min, thereby leading to reduction in productivity of laser welded steel pipes.

(8) Gap Between Weld Line and Irradiated Area on Upper Surface of Open Pipe Irradiated with Laser Beam Preferably, the leading laser beam 3a and the trailing laser beam 3b are arranged such that the centers of the irradiated areas 3-1 and 3-2 of the upper surface of the open pipe 1 coincide with the edges 2, as illustrated in FIG. 4(a). It is, however, difficult to perform welding while these beams 3a and 3b are kept being arranged in the above-described manner, and thus the centers of the irradiated areas 3-1 and 3-2 on the upper surface of the open pipe 1 do not always coincide with the edges 2 during the welding operation. When the gap between the edges 2 and the center of each irradiated area 3-1 or 3-2 increases, the leading laser beam 3a or the trailing laser beam 3b deviates from the butting groove and thus welding defects such as incomplete melting of the groove are more likely to occur.

Although the centers of the irradiated areas 3-1 and 3-2 do not coincide with the edges 2, if welding is performed such that the edges 2 pass through the irradiated areas 3-1 and 3-2, welding defects do not occur. Thus, it is preferable that the gap between the edges and the center of each irradiated area 3-1 or 3-2 be within the radius of the irradiated area 3-1 or 3-2.

In the present invention, laser welding can be performed even on a thick open pipe (for example, having a thickness of 4 mm or larger) without preheating the edges by high-frequency induction heating or by other means. However, preheating the edges by high-frequency induction heating or by other means brings about effects such as improvement in productivity of laser welded steel pipes. When high-frequency induction heating is performed for preheating, an excessive convexity is formed on the weld portion. If the excessive convexity is removed by machining or grinding after laser welding, the surface of the weld portion is finished while having a further preferable property.

(8) Oscillator of Laser Beam

Any of various forms of oscillators can be used as a laser beam oscillator used in the present invention. Preferable examples of the oscillator include a gas laser using a gas (for example, carbon dioxide gas, helium-neon, argon, nitrogen, and iodine) as a medium; a solid laser using a solid (for example, YAG into which a rare earth element is doped) as a medium; a fiber laser using a fiber as a laser medium instead of bulk; and a disk laser. Alternatively, a semiconductor laser may be used.

(9) Auxiliary Heat Source

An auxiliary heat source may be used to heat the open pipe 1 from an outer side of the open pipe 1. The configuration of the auxiliary heat source is not particularly limited as long as the heat source can heat and melt the outer surface of the open pipe 1. For example, means operated with a burner melting method, a plasma melting method, a tungsten inert gas melting method, an electron beam melting method, a laser beam melting method, and other methods are appropriate for the auxiliary heat source.

Preferably, the auxiliary heat source is disposed so as to be integrated with a laser beam oscillator. This is because, if the auxiliary heat source and a laser are not integrally disposed, a large amount of heat is required to obtain an effect of the auxiliary heat source, thereby making reduction of welding defects (such as undercut or underfill) very difficult. It is more preferable that the auxiliary heat source be positioned so as to be ahead of the laser beam oscillator. This is because this positioning allows moisture or oil content to be removed from the edges.

It is more preferable to use an arc as the auxiliary heat source. A device that can apply an electromagnetic force (that is, an electromagnetic force occurring from a magnetic field of welding currents) to a molten metal in such a direction as to prevent burn-through of the molten metal is used as an arc producer. For example, technologies known to date such as a tungsten inert gas welding or plasma arc welding can be used. Preferably, an arc producer is disposed so as to be integrated with a laser beam. The reason for this disposition is, as described above, to effectively exert an influence of the magnetic field, occurring around the welding currents that produce an arc, on a molten metal generated by the laser beam. It is more preferable that the arc producer is positioned so as to be ahead of the laser beam. This is because this positioning allows moisture or oil content to be removed from the edges.

The present invention is still effective even when combined with a technology known to date, such as gas shielded welding or filler metal addition. Such a combined welding technology can be applied to not only manufacturing of welded steel pipes but also welding of thick steel plates.

As described above, according to the present invention, a laser welded steel pipe is manufactured by appropriately maintaining spot diameters of two laser beams, appropriately arranging the two laser beams, and controlling laser welding settings including incident angles of the laser beams. Thus, spattering is prevented from occurring, the likelihood of an undercut or an underfill being formed at a weld portion is reduced, a weld portion of excellent quality is obtained without reducing weld efficiency, and a laser welded steel pipe can be stably manufactured at a high yield ratio. The obtained laser welded steel pipe has a seam that is excellent in terms of low-temperature toughness or corrosion resistance due to exploitation of the advantages of laser welding and is appropriate for oil country tubular goods or a line pipe used in a cold district or a corrosion environment.

EXAMPLE

Laser welded steel pipes were manufactured by forming steel strips into cylindrical open pipes using forming rolls, pressing the edges of the open pipes using squeeze rolls, and emitting two laser beams from the upper surface side of the open pipes as illustrated in FIG. 1. Components of the steel strips are shown in Table 1.

Laser welding was performed using two fiber laser oscillators with a maximum output of 10 kW with the settings being made as shown in Table 2. The distance t (mm) from the upper surface of each open pipe to the focus was fixed to ½T with respect to the strip thickness T. The laser beam incident angles θa and θb shown in Table 2 indicate the angles illustrated in FIG. 3. An incident angle having a negative value indicates that the laser beam is emitted while being inclined toward a direction opposite to the direction A in which welding proceeds.

Welded steel pipes Nos. 1 to 4 and 7 to 10 shown in Table 2 are examples obtained when the laser beams are arranged as illustrated in FIG. 4(a), welded steel pipes Nos. 5 and 11 shown in Table 2 are examples obtained when the laser beams are arranged as illustrated in FIG. 4(b), and a welded steel pipe No. 6 shown in Table 2 is an example obtained when the laser beams are arranged as illustrated in FIG. 4(c).

The examples of the present invention shown in Table 2 (welded steel pipes Nos. 1 to 6) are formed by making an in-focus spot diameter of each laser beam and a gap between the center points of the leading laser beam and the trailing laser beam on the back surface of the open pipe satisfy the ranges according to the present invention. In addition, the examples of the present invention shown in Table 2-1 are formed by emitting the leading laser beam and the trailing laser beam while the leading laser beam and the trailing laser beam are inclined toward the direction in which welding proceeds and by setting the incident angle θa of the leading laser beam to be larger than the incident angle θb of the trailing laser beam.

In comparative examples shown in Table 2-2, a welded steel pipe No. 7 is an example obtained when the incident angle θb of the trailing laser beam is set to 0° (that is, by vertically emitting the trailing laser beam), a welded steel pipe No. 8 is an example obtained when a gap between the center points of the leading laser beam and the trailing laser beam on the back surface is out of the range according to the present invention, a welded steel pipe No. 9 is an example obtained when the in-focus spot diameter of the trailing laser beam is out of the range according to the present invention, a welded steel pipe No. 10 is an example obtained when the leading laser beam is emitted by being inclined toward a direction opposite to the direction A in which welding proceeds, and a welded steel pipe No. 11 is an example obtained when the incident angle θa of the leading laser beam is set to be smaller than the incident angle θb of the trailing laser beam 3b.

After laser welding was performed in the above-described ways, the upper surface of each welded steel pipe was visually inspected to check whether or not spatter has adhered thereto. In addition, a weld bead on the upper surface or the back surface of each welded steel pipe was visually inspected to check whether or not undercut or underfill has occurred. The results of the inspections are shown in Table 3.

As is clear from Table 3, neither adhesion of spatter nor occurrence of undercut/underfill was perceived in the examples according to the invention.

In the comparative examples 7 to 9, undercut, underfill, or incomplete melting of the groove occurred although adhesion of spatter was not perceived. In the comparative examples 10 and 11, adhesion of a large amount of spatter was perceived and underfill occurred.

INDUSTRIAL APPLICABILITY

The present invention is remarkably effective from the industrial point of view because, when laser welded steel pipes are manufactured, the present invention allows laser welded steel pipes to be stably manufactured at a high yield ratio.

REFERENCE SIGNS LIST

1 open pipe
2 edge
3 laser beam
3a leading laser beam
3b trailing laser beam
4 keyhole (cavity)
5 molten metal
6 seam

TABLE 1

| Steel type | Component (mass %) | | | | | | | | | | | Residue | Remarks |
|---|---|---|---|---|---|---|---|---|---|---|---|---|---|
| | C | Si | Mn | P | S | Cr | Ni | Cu | Al | Ti | N | | |
| A | 0.01 | 0.15 | 0.35 | 0.02 | 0.002 | 12.5 | 4.5 | 0.02 | 0.045 | 0.011 | 0.006 | Fe and inevitable impurities | Stainless steel |
| B | 0.06 | 0.21 | 1.11 | 0.01 | 0.001 | 0.1 | 0.1 | 0.05 | 0.032 | 0.023 | 0.006 | Fe and inevitable impurities | Carbon steel |

TABLE 2-1

| Welded steel pipe No. | Steel Sheet | | Laser | Welding Conditions | | | Laser beam | | Welding speed (m/min) | Upset length (mm) | Remarks | |
|---|---|---|---|---|---|---|---|---|---|---|---|---|
| | Steel type | Sheet thickness (mm) | | In-focus spot diameter (mm) | Gap between center points of laser beams on back surface (mm) | Laser power (kW) | incident angle (°) | | | | | |
| 1 | A | 6 | Leading | 0.32 | 2.0 | 10 | θa | 30 | 7.5 | 0.5 | High-frequency preheated and Machined | Example of invention |
| | | | Trailing | 0.52 | | 10 | θb | 15 | | | | |
| 2 | B | 5 | Leading | 0.52 | 2.5 | 10 | θa | 40 | 10 | 0.8 | High-frequency preheated and Machined | Example of invention |
| | | | Trailing | 0.52 | | 10 | θb | 20 | | | | |
| 3 | B | 5 | Leading | 0.48 | 3.1 | 10 | θa | 50 | 10 | 0.6 | High-frequency preheated and Machined | Example of invention |
| | | | Trailing | 0.52 | | 10 | θb | 30 | | | | |
| 4 | A | 4 | Leading | 0.48 | 4.5 | 10 | θa | 20 | 12 | 0.4 | High-frequency preheated and Machined | Example of invention |
| | | | Trailing | 0.48 | | 10 | θb | 5 | | | | |
| 5 | A | 4 | Leading | 0.52 | 1.6 | 8 | θa | 30 | 10 | 0.2 | High-frequency preheated and Not Machined | Example of invention |
| | | | Trailing | 0.64* | | 10 | θb | 10 | | | | |
| 6 | A | 6 | Leading | 0.64* | 2.0 | 8 | θa | 30 | 7.5 | 1 | High-frequency preheated and Not Machined | Example of invention |
| | | | Trailing | 0.32 | | 8 | θb | 15 | | | | |

*Laser beam is divided into two by optical system (prism)

TABLE 2-2

| Welded steel pipe No. | Steel Sheet | | Laser | Welding Conditions | | | Laser beam | | Welding speed (m/min) | Upset length (mm) | Remarks | |
|---|---|---|---|---|---|---|---|---|---|---|---|---|
| | Steel type | Sheet thickness (mm) | | In-focus spot diameter (mm) | Gap between center points of laser beams on back surface (mm) | Laser power (kW) | incident angle (°) | | | | | |
| 7 | A | 6 | Leading | 0.32 | 3.5 | 10 | θa | 30 | 7.5 | 0.5 | High-frequency preheated and Machined | Comparative example |
| | | | Trailing | 0.52 | | 10 | θb | 0 | | | | |

TABLE 2-2-continued

| | | | | Welding Conditions | | | | | | | | |
|---|---|---|---|---|---|---|---|---|---|---|---|---|
| | Steel Sheet | | | In-focus | Gap between center points of | | Laser beam | | | | | |
| Welded steel pipe No. | Steel type | Sheet thickness (mm) | Laser | spot diameter (mm) | laser beams on back surface (mm) | Laser power (kW) | incident angle (°) | | Welding speed (m/min) | Upset length (mm) | Remarks | |
| 8 | B | 5 | Leading Trailing | 0.52 0.52 | 0.0 | 10 10 | θa θb | 45 20 | 10 | 0.8 | High-frequency preheated and Machined | Comparative example |
| 9 | B | 5 | Leading Trailing | 0.48 0.27 | 3.1 | 10 10 | θa θb | 50 30 | 10 | 0.6 | High-frequency preheated and Machined | Comparative example |
| 10 | A | 4 | Leading Trailing | 0.48 0.32 | 1.0 | 10 10 | θa θb | −10 15 | 12 | 0.4 | High-frequency preheated and Machined | Comparative example |
| 11 | A | 4 | Leading Trailing | 0.52 0.64* | 1.5 | 8 10 | θa θb | 10 35 | 10 | 0.2 | High-frequency preheated and Not Machined | Comparative example |

*Laser beam is divided into two by optical system (prism)

TABLE 3

| Join No. | Whether or not spatter adheres to upper surface of welded steel pipe | Appearance of upper surface of welded steel pipe | Appearance of back surface of welded steel pipe | Remarks |
|---|---|---|---|---|
| 1 | Not adhered | Good | Good | Example of invention |
| 2 | Not adhered | Good | Good | Example of invention |
| 3 | Not adhered | Good | Good | Example of invention |
| 4 | Not adhered | Good | Good | Example of invention |
| 5 | Not adhered | Good | Good | Example of invention |
| 6 | Not adhered | Good | Good | Example of invention |
| 7 | Not adhered | Undercut occurred | Good | Comparative example |
| 8 | Not adhered | Good | Underfill occurred | Comparative example |
| 9 | Not adhered | Undercut occurred | Groove partially remained unmelted | Comparative example |
| 10 | Large amount of spatter adhered | Undercut occurred | Underfill occurred | Comparative example |
| 11 | Large amount of spatter adhered | Undercut occurred | Underfill occurred | Comparative example |

The invention claimed is:

1. A method of manufacturing a laser welded steel pipe by forming a steel strip into a cylindrical open pipe with forming rolls and performing laser welding on edges of the open pipe by emitting a laser beam onto the edges of the open pipe while pressing the edges with squeeze rolls, the method comprising:
emitting two laser beams along the edges from an upper surface side of the open pipe, the two laser beams being transmitted through different optical fibers and having in-focus spot diameters exceeding 0.3 mm;
emitting the laser beams such that a leading laser beam of the two laser beams and a trailing laser beam of the two laser beams are each inclined toward a direction in which welding proceeds at an incident angle with respect to a direction perpendicular to an upper surface of the open pipe, the leading laser beam being ahead of the trailing laser beam on the upper surface of the open pipe in the direction in which welding proceeds, the trailing laser beam being behind the leading laser beam on the upper surface of the open pipe in the direction in which welding proceeds;
setting the incident angle of the leading laser beam to be larger than the incident angle of the trailing laser beam; and
setting a gap between a center point of the leading laser beam and a center point of the trailing laser beam on a back surface of the open pipe to 1 mm or larger.

2. The method of manufacturing a laser welded steel pipe according to claim 1, wherein the incident angles of the leading laser beam and the trailing laser beam fall within a range from 5 to 50°, with the proviso that the incident angle of the leading laser beam is larger than the incident angle of the trailing laser beam.

3. The method of manufacturing a laser welded steel pipe according to claim 1, wherein either one or both of the leading laser beam and the trailing laser beam are divided into two by an optical component and emitted onto both sides of the edges.

4. The method of manufacturing a laser welded steel pipe according to claim 1, wherein a weld portion receives an upset in the range of 0.2 to 1.0 mm when the laser welding is performed.

5. The method of manufacturing a laser welded steel pipe according to claim 1, wherein the laser welding is performed with the sum of laser power of the leading laser beam and the trailing laser beam exceeding 16 kW and at a welding speed exceeding 7 m/min.

6. The method of manufacturing a laser welded steel pipe according to claim 1, wherein the steel strip is preheated before the laser welding is performed and a weld bead is processed by machining or grinding after the laser welding has been performed.

* * * * *